US012061310B2

(12) United States Patent
Silva et al.

(10) Patent No.: US 12,061,310 B2
(45) Date of Patent: Aug. 13, 2024

(54) RECALIBRATION OF RISK RELATED MODELS IMPACTED BY CLIMATE

(71) Applicant: International Business Machines Corporation, Armonk, NY (US)

(72) Inventors: Bruno Silva, Sao Paulo (BR); Marco Aurelio Stelmar Netto, Sao Paulo (BR); Priscilla Barreira Avegliano, Sao Paulo (BR); Eduardo Rocha Rodrigues, Sao Paulo (BR)

(73) Assignee: International Business Machines Corporation, Armonk, NY (US)

( * ) Notice: Subject to any disclaimer, the term of this patent is extended or adjusted under 35 U.S.C. 154(b) by 198 days.

(21) Appl. No.: 17/496,430

(22) Filed: Oct. 7, 2021

(65) Prior Publication Data

US 2023/0116608 A1 Apr. 13, 2023

(51) Int. Cl.
*G01W 1/10* (2006.01)
*G01W 1/18* (2006.01)
*G06N 7/01* (2023.01)

(52) U.S. Cl.
CPC ............... *G01W 1/10* (2013.01); *G06N 7/01* (2023.01); *G01W 1/18* (2013.01)

(58) Field of Classification Search
CPC ............. G01W 1/10; G01W 1/18; G06N 7/01
See application file for complete search history.

(56) References Cited

U.S. PATENT DOCUMENTS

| 8,214,308 B2 | 7/2012 | Chu |
| 2009/0070170 A1 | 3/2009 | Krishnamurthy |
| 2010/0131800 A1* | 5/2010 | Fujimaki ............ G05B 23/0281 702/183 |
| 2011/0246385 A1 | 10/2011 | Laxmanan et al. |
| 2013/0024118 A1 | 1/2013 | Gershunov et al. |

(Continued)

FOREIGN PATENT DOCUMENTS

| CN | 104700179 A | 6/2015 |
| CN | 109255485 A | 1/2019 |

(Continued)

OTHER PUBLICATIONS

International Search Report dated Nov. 28, 2022 issued in PCT/CN2022/121736, 9 pages.

(Continued)

*Primary Examiner* — Yoshihisa Ishizuka
(74) *Attorney, Agent, or Firm* — Scully, Scott, Murphy & Presser, P.C.; Anthony Mauricio Pallone

(57) ABSTRACT

One or more processors may detect that an extreme event that occurred in a first region. One or more processors may determine that the extreme event creates a drift in a probability distribution that is an output of a model associated with the first region. One or more processors may retrain the model associated with the first region using data associated with the extreme event. One or more processors may identify a second region similar to the first region according to a defined correlation threshold. One or more processors may generate data representing potential extreme scenarios for the second region based on the detected extreme event in the first region. One or more processors may retrain a model associated with the second region based on the generated data representing potential extreme scenarios.

20 Claims, 9 Drawing Sheets

(56) References Cited

U.S. PATENT DOCUMENTS

| | | | |
|---|---|---|---|
| 2013/0035860 A1* | 2/2013 | Guha | G01W 1/10 |
| | | | 702/3 |
| 2013/0110399 A1 | 5/2013 | Moss et al. | |
| 2014/0007244 A1 | 1/2014 | Martin et al. | |
| 2014/0337086 A1 | 11/2014 | Asenjo et al. | |
| 2016/0196513 A1 | 7/2016 | Mallon et al. | |
| 2016/0307138 A1* | 10/2016 | Heng | G06N 5/04 |
| 2017/0169534 A1* | 6/2017 | Wani | G06Q 50/265 |
| 2018/0096253 A1 | 4/2018 | Goldstein et al. | |
| 2019/0179053 A1 | 6/2019 | Shafer | |
| 2020/0132884 A1* | 4/2020 | Rothenberg | G06N 5/04 |
| 2021/0109834 A1* | 4/2021 | Singh | G06F 11/327 |

FOREIGN PATENT DOCUMENTS

| | | |
|---|---|---|
| CN | 109814178 A | 5/2019 |
| CN | 111160608 A | 5/2020 |
| CN | 111915158 A | 11/2020 |
| KR | 101200368 | 11/2012 |
| KR | 20130078659 A | 7/2013 |
| WO | 2017049188 A1 | 3/2017 |

OTHER PUBLICATIONS

NIST, "NIST Cloud Computing Program", http://csrc.nist.gov/groups/SNS/cloud-computing/index.html, Created Dec. 1, 2016, Updated Oct. 6, 2017, 9 pages.

Weigel, A., et al., "Risks of Model Weighting in Multimodel Climate Projections", Journal of Climate, Aug. 1, 2010, pp. 4175-4191, vol. 23, No. 15.

Armal, S., et al., "Trends in Extreme Rainfall Frequency in the Contiguous United States: Attribution to Climate Change and Climate Variability Modes", Journal of Climate, Manuscript received Feb. 19, 2017, in final form Aug. 24, 2017, Jan. 1, 2018, pp. 369-384, vol. 31.

Bellprat, O., "Towards reliable extreme weather and climate event attribution", Nature Communications, 2019, pp. 1-7, 10:1732.

Jasra, A., et al., "Advanced Multilevel Monte Carlo Methods", arXiv:1704.07272v1, Apr. 24, 2017, pp. 1-41.

Ong, Y.S., et al., "Evolutionary Optimization of Computationally Expensive Problems via Surrogate Modeling", AIAA Journal, Apr. 2003, pp. 697-696, vol. 41, No. 4.

Planton, S., et al., "Expected impacts of climate change on extreme climate events", C. R. Geoscience 340 (2008), Received Dec. 2, 2007, accepted after revision Jul. 21, 2008, Available online Sep. 16, 2008, pp. 564-574.

Xu, Y., et al., "Risk Assessment of Rare Events in Probabilistic Power Flow via Hybrid Multi-Surrogate Method", IEEE Transactions on Smart Grid, Mar. 20, 2019, pp. 1-11.

Zwiers, F.W., et al., "Climate Extremes: Challenges in Estimating and Understanding Recent Changes in the Frequency and Intensity of Extreme Climate and Weather Events", https://www.ssec.wisc.edu/~kossin/articles/Zwiers_etal_2013.pdf, Accessed on Oct. 7, 2021, pp. 339-389.

\* cited by examiner

RECALIBRATION OF RISK RELATED MODELS IMPACTED BY CLIMATE

BACKGROUND

The present application relates generally to computers and computer applications, and more particularly to machine learning, risk related models, and retraining or recalibration of models.

Climate change may drive extreme weather events such as heat waves, cold waves, extreme precipitation, droughts, tornadoes, cyclones, and/or other events. Computer systems may implement models for insights or predictions to vulnerabilities related to many hazards in environments, and more and more those models incorporate weather and climate events. For example, such models can be climate or weather aware models. Such models have industrial uses, including but not limited to, supply chain, digital agriculture, financial sectors, among others.

For example, these models can be probabilistic and may present probability distribution of hazards. Extreme events, however, may dramatically change such probability distributions and those events tend to be difficult to predict due to their non-stationarity property, for instance, brought by climate change. Such extreme events can be difficult to forecast or predict using past data, consequently rendering previously built climate or weather aware models inaccurate.

BRIEF SUMMARY

The summary of the disclosure is given to aid understanding of a computer system and method of recalibration of risk related models, and not with an intent to limit the disclosure or the invention. It should be understood that various aspects and features of the disclosure may advantageously be used separately in some instances, or in combination with other aspects and features of the disclosure in other instances. Accordingly, variations and modifications may be made to the computer system and/or their method of operation to achieve different effects.

A computer-implemented method, in an aspect, can include detecting that an extreme event occurred in a first region. The method can also include determining that the extreme event creates a drift in a probability distribution that is an output of a model associated with the first region. The method can further include retraining the model associated with the first region using data associated with the extreme event. The method can also include identifying a second region similar to the first region according to a defined correlation threshold. The method can further include generating data representing potential extreme scenarios for the second region based on the detected extreme event in the first region. The method can also include retraining a model associated with the second region based on the generated data representing potential extreme scenario.

A system, in an aspect, can include a processor and a memory device coupled with the processor. The processor can be configured to detect that an extreme event occurred in a first region. The processor can also be configured to determine that the extreme event creates a drift in a probability distribution that is an output of a model associated with the first region. The processor can also be configured to retrain the model associated with the first region using data associated with the extreme event. The processor can also be configured to identify a second region similar to the first region according to a defined correlation threshold. The processor can also be configured to generate data representing potential extreme scenarios for the second region based on the detected extreme event in the first region. The processor can also be configured to retrain a model associated with the second region based on the generated data representing potential extreme scenarios.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

In one or more embodiments, systems, methods and techniques can be provided, which can automatically identify and trigger risk-related model recalibration based on early detection of changes in probability distributions of properties (drifts) of risk-related models caused by one or more extreme events. In the disclosure herein, model recalibration based on events is described with respect to one or more extreme events occurring in a given region to trigger the recalibration of a similar region's model. However, this approach, e.g., the systems, methods, and techniques disclosed herein, can be applied or used in other contexts. An extreme event can be an event that exceeds a threshold intensity.

Figure 1:
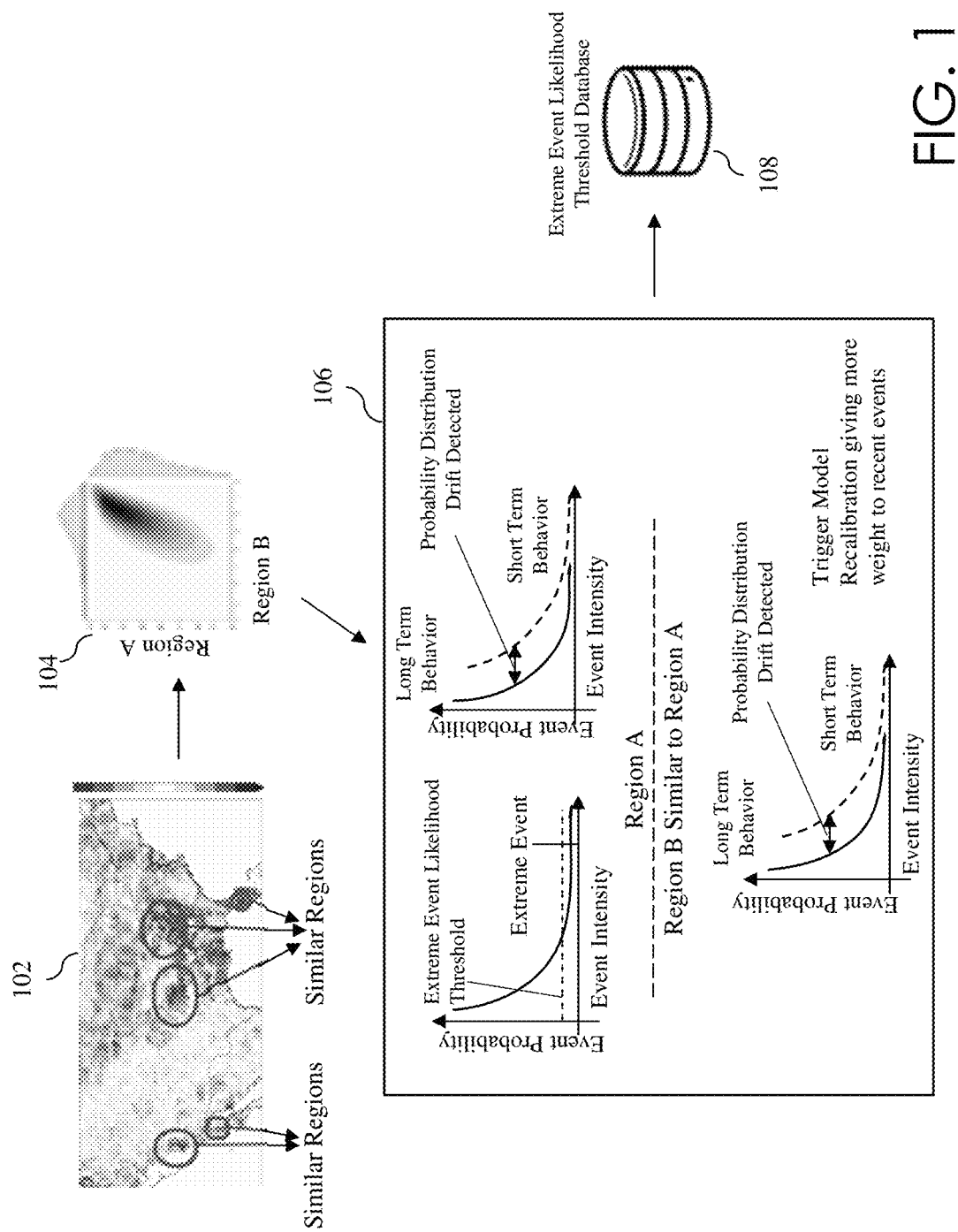
FIG. 1 is a diagram illustrating an example of recalibrating a region's model based on an event occurring in a similar region in an embodiment.

FIG. 1 is a diagram illustrating an example of recalibrating a region's model based on an event occurring in a similar region in an embodiment. In an embodiment, a system and/or method disclosed herein can use the knowledge that an extreme event happened in a given region to trigger the recalibration of a model (e.g., weather aware model) of a similar region. An extreme event can be an event that exceeds a threshold. In an embodiment, for determining similarities of geographic regions, geospatial analogous properties of multiple regions can be observed, and regions can be grouped or classified according to the similarities in the geospatial properties. Similarities can be determined based on comparing properties and those that meet a threshold similarity can be determined to be similar. Such threshold similarity can be preconfigured or predefined.

For example, the map shown at 102 illustrates groups of regions having geospatial analogous properties related to changes in summer rainfall over a period (e.g. 3 decades). The plot shown at 104 illustrates copulas that identifies possible causation correlation among events in different locations. Shown at 106, cross-check of multi-region model conditions for extreme event can be performed before recalibration. For instance, given the short term behavior of "Region A", model recalibration of a model of "Region B" determined to be similar to "Region A" can be triggered, for example, incorporating possible future scenarios projected from one or more extreme events detected in "Region A". At 108, continuous adjustment of extreme event detection sensitivity for similar regions can be performed, for example, by using or implementing machine learning.

For example, in one or more embodiments, a system can automatically identify and trigger risk-related model recalibration for multiple geographies based on early detection of changes in probability distributions of properties (drifts) of risk-related models caused by climate change and extreme weather events. In an embodiment, a system which automatically identifies and triggers such recalibration may use geospatial analogous properties of multiple regions. For example, a system and/or method can perform time-weighted recalibration of probabilistic models using extreme events detection in a geospatial analogous region and identification of correlated probability distribution drift in both regions. Such a system may also use copulas to identify possible causation correlation among events in different locations. Such a system may also cross-check multi-region model conditions for extreme event before recalibration. Such a system may further perform a continuous adjustment of extreme event detection sensitivity for similar regions using machine learning. A system and/or method can proactively improve global scale risk-related models impacted by climate change and extreme weather events as they are recalibrated according to the similarities of multiple regions, e.g., using copulas and cross-checking of multi-region model conditions. For example, a system may determine when and how to recalibrate climate or weather aware models owning to climate change and extreme event detection across multiple geographies.

Figure 2:
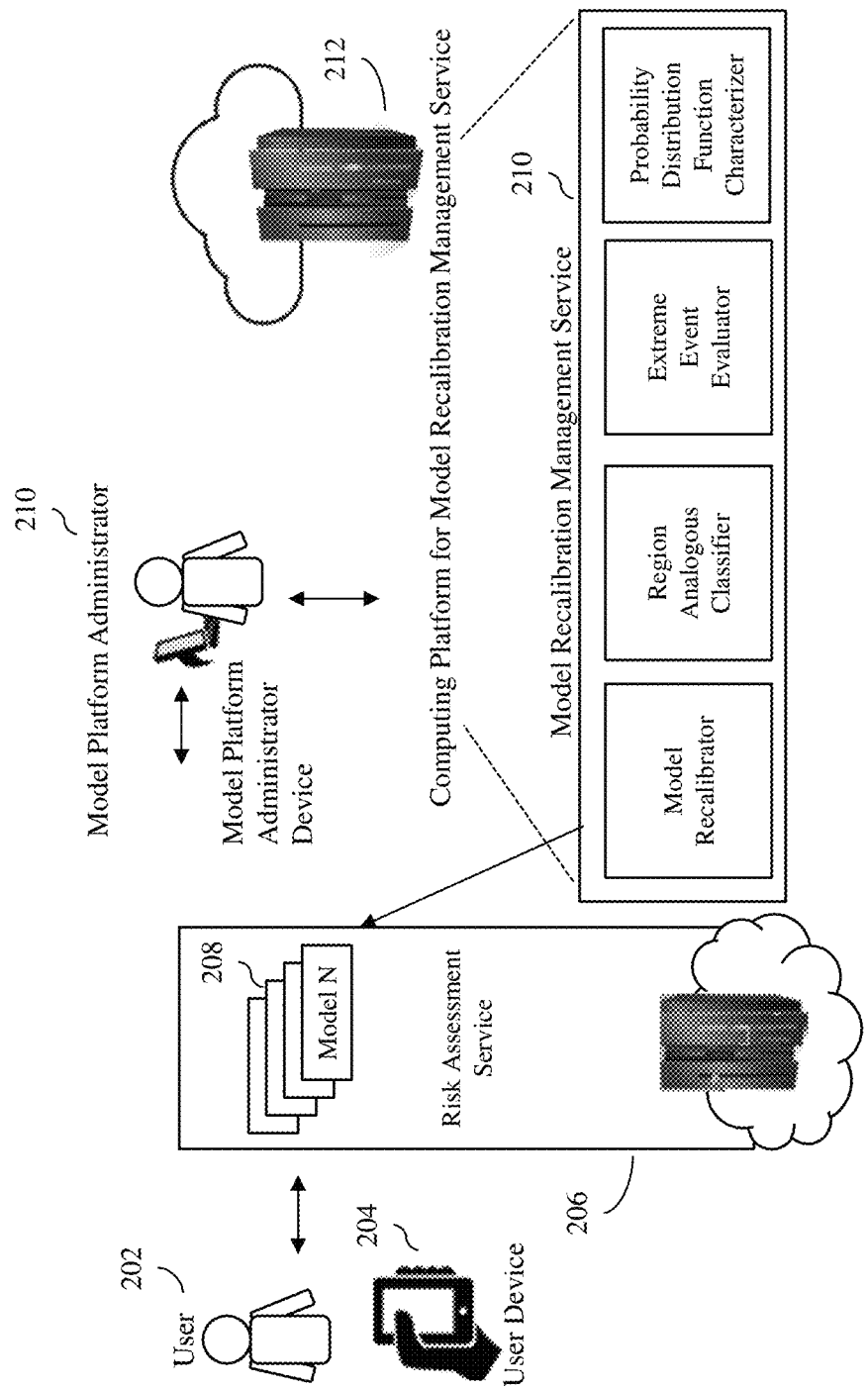
FIG. 2 is a diagram illustrating an overview of a system in an embodiment, which can handle recalibration of models based on events.

FIG. 2 is a diagram illustrating an overview of a system in an embodiment, which can handle recalibration of models based on events. The components shown include computer-implemented components, for instance, implemented and/or run on one or more hardware processors, or coupled with one or more hardware processors. One or more hardware processors, for example, may include components such as programmable logic devices, microcontrollers, memory devices, and/or other hardware components, which may be configured to perform respective tasks described in the present disclosure. Coupled memory devices may be configured to selectively store instructions executable by one or more hardware processors.

A processor may be a central processing unit (CPU), a graphics processing unit (GPU), a field programmable gate array (FPGA), an application specific integrated circuit (ASIC), another suitable processing component or device, or one or more combinations thereof. The processor may be coupled with a memory device. The memory device may include random access memory (RAM), read-only memory (ROM) or another memory device, and may store data and/or processor instructions for implementing various functionalities associated with the methods and/or systems described herein. The processor may execute computer instructions stored in the memory or received from another computer device or medium.

In an embodiment, a request can be received from a user 202 or another computer system, for example, via a user device 204 or like, which can interact with a risk-related service 206. The risk-related service 206 provides information related to risk and event resilience planning, and can include a plurality of models 208, e.g., weather or climate aware models. The models 208 can be a set of risk related computer models implemented to forecast events such as flooding, high or low temperatures, transportation delays, energy distribution, wildfire, among others. The models 208 can include one or more machine learning models, e.g., trained based on training data, which may include historic data. A model platform administrator (MPA) 210 may be a person or an automated system managing the models 208 consumed by the risk assessment service 206. The MPA 210 may also be responsible to setup or configure a model recalibration management service 212. A computing platform for model recalibration management service 212 can be a computing platform that hosts the model recalibration management service 210, which can be an on-premise platform or a cloud computing platform, and can include CPUs, storage, network and other hardware. The model recalibration management service can include processing components or modules, which may trigger recalibration of models. The processing components can include a probability distribution function characterizer, which can generate and/or analyze probability distribution or likelihood of extreme events, e.g., based on model output; a region analogous classifier, which can classify, cluster or segment regions into similar regions based on their properties or attributes; an extreme event evaluator, which can includes sensors, data analysis tool, and others for detecting an occurrence of an extreme event in a region; and a model recalibrator, which can include a functionality for retraining or adjusting one or more models 208.

Figure 3:
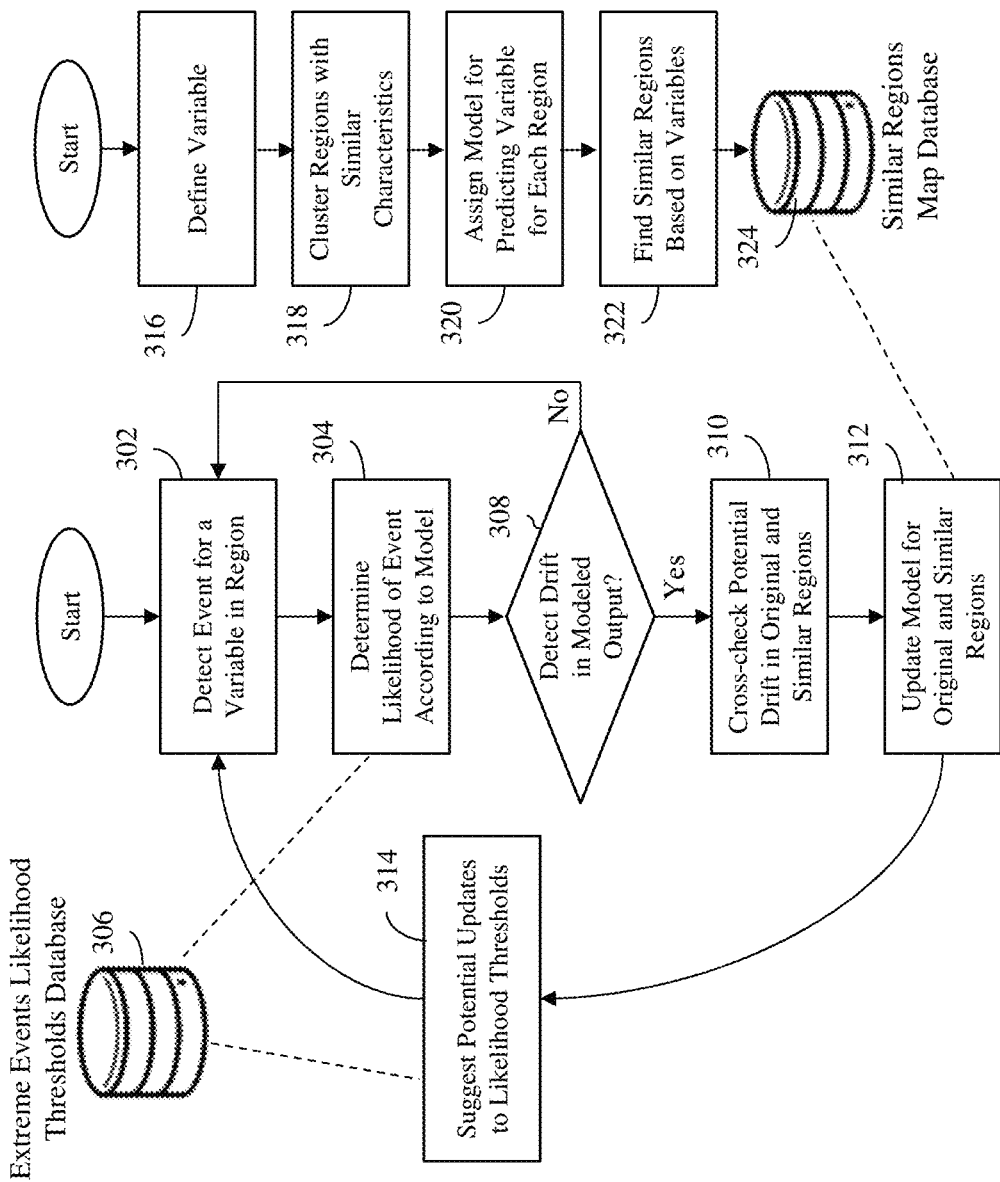
FIG. 3 is a flow diagram illustrating a method of recalibrating a model based on an event in an embodiment.

FIG. 3 is a flow diagram illustrating a method of recalibrating a model based on an event in an embodiment. The method can be performed by or implemented on one or more hardware processors. At 302, an event such as an extreme event for a climatic variable can be detected in a region, e.g., "Region X". One or more techniques can be used for detecting an extreme event for a specific region, e.g., Region X. The extreme event can be detected using remote sensing on the region of interest (e.g., analyzing images of floods in the region), sensors capturing information of a given region such as level of water or temperature measurement stations, and/or crawling or searching web information, social media information (e.g., using natural language processing on social media or social network data, news websites). Other techniques for extreme event detection can include, but not limited to, outlier or anomaly detection methods such as Z-scores, density-based techniques, cluster analysis to detect extreme events for a given region, e.g., Region X.

A database 306 or the like repository can store data such as the likelihood thresholds of extreme events for each place. At 304, a likelihood that an extreme event would occur, can be determined according to a model, e.g., by running a trained or learned model. A model, for example, may have been trained based on past historic data, for example, to predict weather events. The model can be a machine learning model. For example, the model outputs probability or likelihood of an extreme event.

For instance, once the extreme event is detected, a processor running the method disclosed herein can determine how the extreme event fits the existing model. The model, for example, is one that can provide a probability for events considering a given intensity I and time T, e.g., provided or created as described at 320. The model can be used to estimate the likelihood of an extreme event. Different approaches can be used to determine the likelihood L of a given event E. For example, data-driven models such as neural networks provide event probability as output. As another example, simulation models can also be employed to provide such likelihood in conjunction with sampling methods like Monte Carlo approaches. A pure statistical analysis may also be performed to assess such likelihood. As further described below, such a model can further be updated or recalibrated using a methodology disclosed herein in an embodiment. The recalibration can be done continually in an embodiment.

At 308, based on the model's output, it is determined whether a drift in modeled probability distribution can be detected. For example, it is determined whether the extreme event creates a drift in the probability distribution that is an output of the model. In an embodiment, the MPA or like user can provide a likelihood threshold to determine whether an event is to be considered an extreme event that triggers the recalibration of climate models. The likelihood threshold defines how rare an event should be in order to trigger the recalibration of the probability distribution. For instance, assume a precipitation model predicts a likelihood for precipitation higher than 50 millimeters (mm) is 0.001 percent. If this event actually happens (e.g., the processor detected the event at 302) and the likelihood threshold is 0.1 percent, then the processor detected an event that is very unlikely to happen. A drift is detected, e.g., if the predicted likelihood is less than the likelihood threshold. As another example, consider that a probability distribution of experiencing an event with a given intensity is estimated. Once an event that has very low probability of happening is detected, it infers that the previously calculated probability distribution is no longer correct.

In another embodiment, the processor can compare the probability distribution of the climate variable using a short term period and a long term period to verify a potential drift in the probability distribution. For instance, the system can compare the probability distribution for the climate variable using two years (short period) and ten years (long period) to verify if the probability distributions are equivalent. For example, suppose the probability distribution of a given climatic variable for the long period is normal with parameters mu (mean value) and theta (standard deviation value). If the distribution changed or the parameters mu or theta are different for a shorter period, then the processor can detect a distribution drift, as the events that took place more recently seems to follow a probability distribution that differs from its past behaviour. The processor can use methods like Kolmogorov-Smirnov, Cramer-von Mises, and Anderson-Darling to check the probability distributions equivalence, or graphical tools, that can be seen as a heuristic, to provide an educated guess about the drift.

If the current model explains the extreme event properly (i.e., probability drift not found), the processor returns to 302. Thus, if no drift is detected, the method may loop back to 302, for detecting an extreme event. For instance, in this case, the model need not be recalibrated.

Otherwise, (i.e., probability drift detected) the processor updates the model for the region, e.g., Region X, and a set of similar regions. For example, if at 308, a drift is detected, the model for this region can be retrained using data associated with the detected extreme event. Also, if at 308, a drift is detected, at 310, cross-checking of the potential drift in the original and similar regions is performed. For example, a processor can evaluate if the drift in the distribution also occurs in other regions, which are similar to Region X. For instance, processor can evaluate if the drift in the distribution also occurs in other regions by assuming the shape of the probability distribution and fitting the parameters of such probability distribution for old data and for the new data that contains the observed extremes. If the parameters of the probability distribution are substantially different (their difference is greater than a given interval), it may be assumed that there was a drift in the probability distribution. In an embodiment, by correlating using copulas, the processor can estimate the probability of having an extreme event of a given intensity on the regions similar to Region X, depending on the level of calculated correlation. For instance, the copulas capture the correlation of historical data. Based on such correlation of historical data, the processor can model conditional probabilities, such as: once an event of intensity is observed a on Region X, there exists 60% chance of observing a correlated event with at least intensity y on Region Y. Therefore, while extrapolating and generating all possible scenarios that can happen at Region B given that an extreme event was detected on Region A, one can surpass the 'likelihood threshold' of Region Y, triggering a new recalibration of the probability distributions, that should take into account the estimated possible scenarios generated by the copula. For instance, data representing potential extreme scenarios for the second region can be generated based on the detected extreme event in the first region. The processor in an embodiment can use the above-described approach of the comparison of thresholds and likelihoods and/or the probability distributions comparison using short and long-term periods.

At 312, the model is updated for the region, e.g., Region X. One or more other regions having similar or analogous properties to the region (e.g., Region X) are identified. For example, a database of similar regions 324 can be searched or looked up to identify one or more similar regions. For example, a process that finds such similar regions may run asynchronously (e.g., processing at 316, 318, 320, 322), e.g., in parallel. Models associated with those regions can also be identified and may also be updated. For example, the processor running the method can trigger the recalibration of Region X and all the similar regions considering a similarity or correlation threshold, which for example can be defined by an administrator or the like. Updating or recalibration can include retraining a model of a similar region. An administrator is also referred to as a model platform administrator (MPA). The reassessment may create models in which the likelihood of extreme events like the one observed are feasible. Considering an example of precipitation, the new model provides a probability for precipitation higher than the threshold likelihood previously defined for the region (e.g., Region X) and the similar regions.

Figure 5:
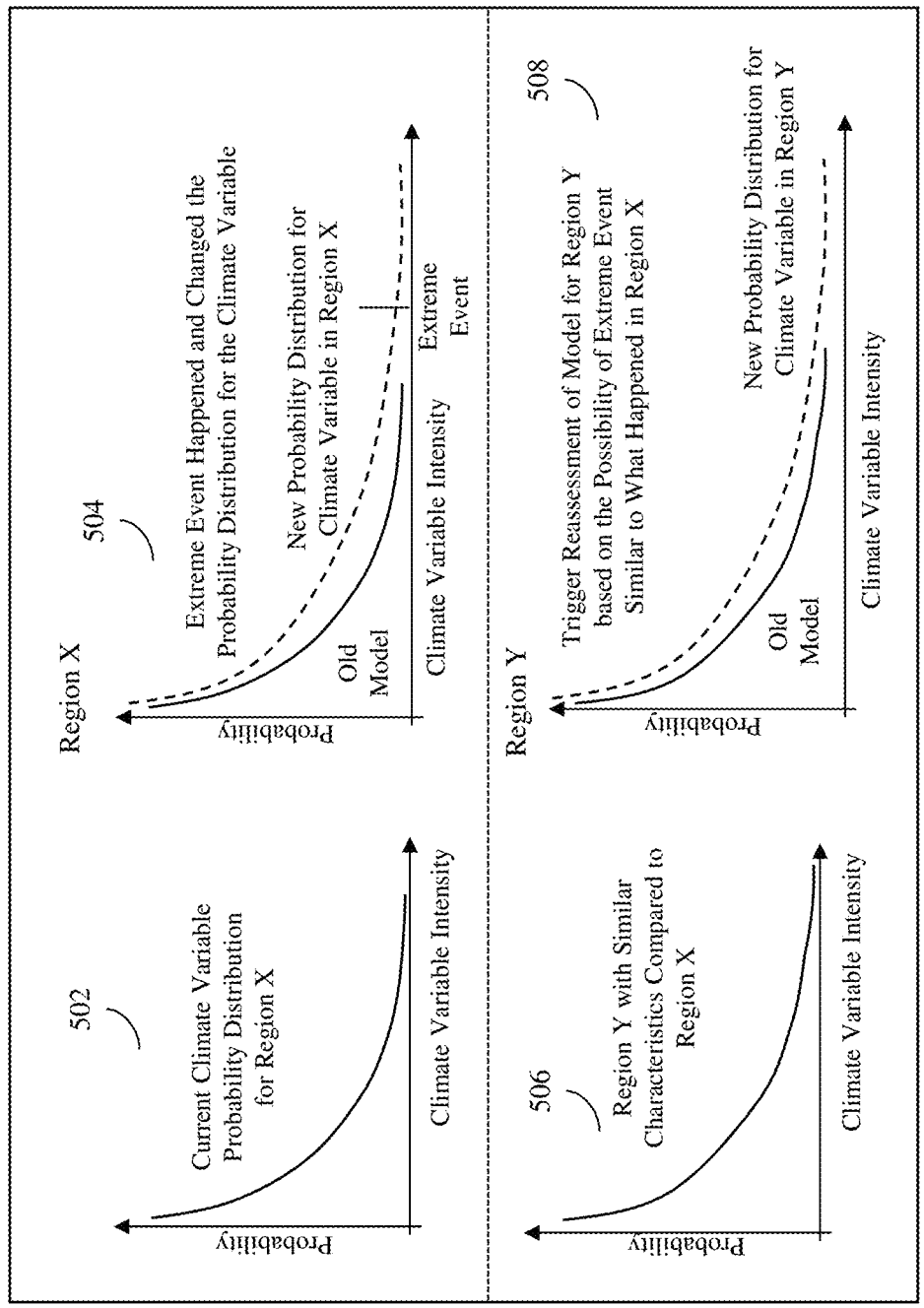
FIG. 5 is a diagram illustrating recalibrating of models in an embodiment.

For example, FIG. 5 shows recalibrating of models in an embodiment. The graphs show examples of probability distribution, for example, which can be output by a weather or climate aware model, which can predict an extreme climate event. For instance, the y-axis shows the probability, and the x-axis shows the climate variable intensity. For instance, higher climate variable intensity on x-axis would indicate more extremeness of an event, e.g., as a result of that intensity on the environment. For example, the current climate variable probability distribution for Region X is shown at 502. The graph at 504 shows that an extreme even happened and changed the probability distribution for the climate variable. For instance, using the new data, Region X's model can be retrained or recalibrated. Such retraining or recalibrating can include updating weights in a neural network model, adjusting parameters on a model, and/or others. New probability distribution for Region X is shown as a dotted curve in 504. For example, the recalibrated or retrained model may output such probability distribution.

The graph at 506 shows a probability distribution for Region Y, which has similar characteristics (e.g., geospatial or geographical properties) compared to Region X. The probability distribution for Region Y shown at 506, for example, is output by Region Y's prediction model (e.g., a neural network, another machine learning model). Reassessment or recalibration of Region Y's model can be triggered for Region Y, e.g., assuming the possibility of extreme event similar to what happened in Region X. The reassessment or recalibration can be done by merging historical data with projected future scenarios predicted with the copula. For instance, like the Region X's model, Region Y's model may be retrained based on additional data associated with the extreme event that happened in Region X. Such retraining updates or recalibrates the model's weights or parameters. The graph at 508 shows new probability distribution for climate variable in Region Y. The recalibration process alters the parameters of the probability distribution and, in consequence, the likelihood of experiencing events with a given intensity.

Referring back to FIG. 3, at 314, in an embodiment, the processor running the method may suggest one or more potential updates to one or more likelihood thresholds. For example, if new recalibrations are performed and the new models can successfully explain extreme events, the processor running the method can recommend or suggest one or more new threshold values that can be used to consider likely events. In this way, the method can include learning what values of thresholds can better be used to recalibrate one or more models, e.g., weather models. In an embodiment, the method can use regression methods to determine what combination of reassessment frequency, model accuracy, region similarity level to use to predict the extreme event likelihoods using data present in the database 306.

In an embodiment, another process may run for finding similar regions. For instance, multiple processes or threads on a computing system can run to perform model recalibration and similar regions identification. At 316, a climatic variable can be defined. For instance, a set of geographical areas and a target climatic variable can be configured. For instance, in an embodiment, an administrator (e.g., MPA) or another user may define a set of geographical areas available for risk assessment for performing model recalibration. Examples of areas can be North America, South of Europe or another geographical identification. The MPA or another user may also define the target climatic variable. This set of areas may include several geographical regions at smaller scale, for examples regions that include cities or counties with similar climatic characteristics. In an embodiment, a processor running the method may find such regions automatically. Examples of the climatic variable can be precipitation, temperature, solar irradiation, and/or others. For instance, a weather prediction model can be used for predicting precipitation. However, other variables such as temperature, solar irradiation, humidity can be used to characterize the evaluated region. In another embodiment, the method can have a set of predefined climatic variables, which can be based on the location of the region or the industry in which the user is performing risk assessment. In an embodiment, a selection of reduced set of variables can be used to balance computational power in making decisions related to recalibration of models and to make a system more scalable.

At 318, regions with similar characteristics can be clustered. The clustering groups nearby points on a geographic map that behave similarly. For example, the method may include segmenting geographically contiguous regions with similar characteristics. Characteristics may include, but are not limited to, geospatial properties such as soil properties, weather conditions, vegetation, and/or others. In another embodiment, characteristics may include non-geospatial properties, e.g., economic factors of a region, population characteristics, and/or others. Within an area defined at 316, multiple regions can be extracted or segmented containing similar characteristics based on the climatic variables. For example, two regions can be considered similar if the same climatic variable behaves the same way on both locations (e.g., regions that present a very defined dry and rainy seasons). In an embodiment, one or more clustering methods (e.g., K-means clustering or another clustering or segmentation method) can be implemented to extract and/or segment a set of disjoint regions using the defined climatic variable or a set of climatic variables. In an embodiment, the union of all segmented regions make up the area defined (or received) at 316.

At 320, a model can be assigned for predicting climate variable for each region. For instance, the processor running the method can associate a model with each region identified at 318. In an embodiment, a user such as the MPA may provide the model. In another embodiment, the processor running the method can automatically create the model using one or more techniques. Examples of such techniques include, but are not limited to, data-driven, simulation, parametric statistical methods (e.g., based on a set of predefined cookbooks for such model creation, which is usually done by domain experts). By using this model, the processor can derive the likelihood of a given weather-related event for a region, e.g., Region X. For instance, considering a precipitation model, the processor can compute the precipitation likelihood L of intensity I for a given Region A at time T. In an embodiment, techniques such as Monte Carlo simulation methods can be used to calculate the likelihood of the event occurring, using a given stochastic model M.

Figure 4:
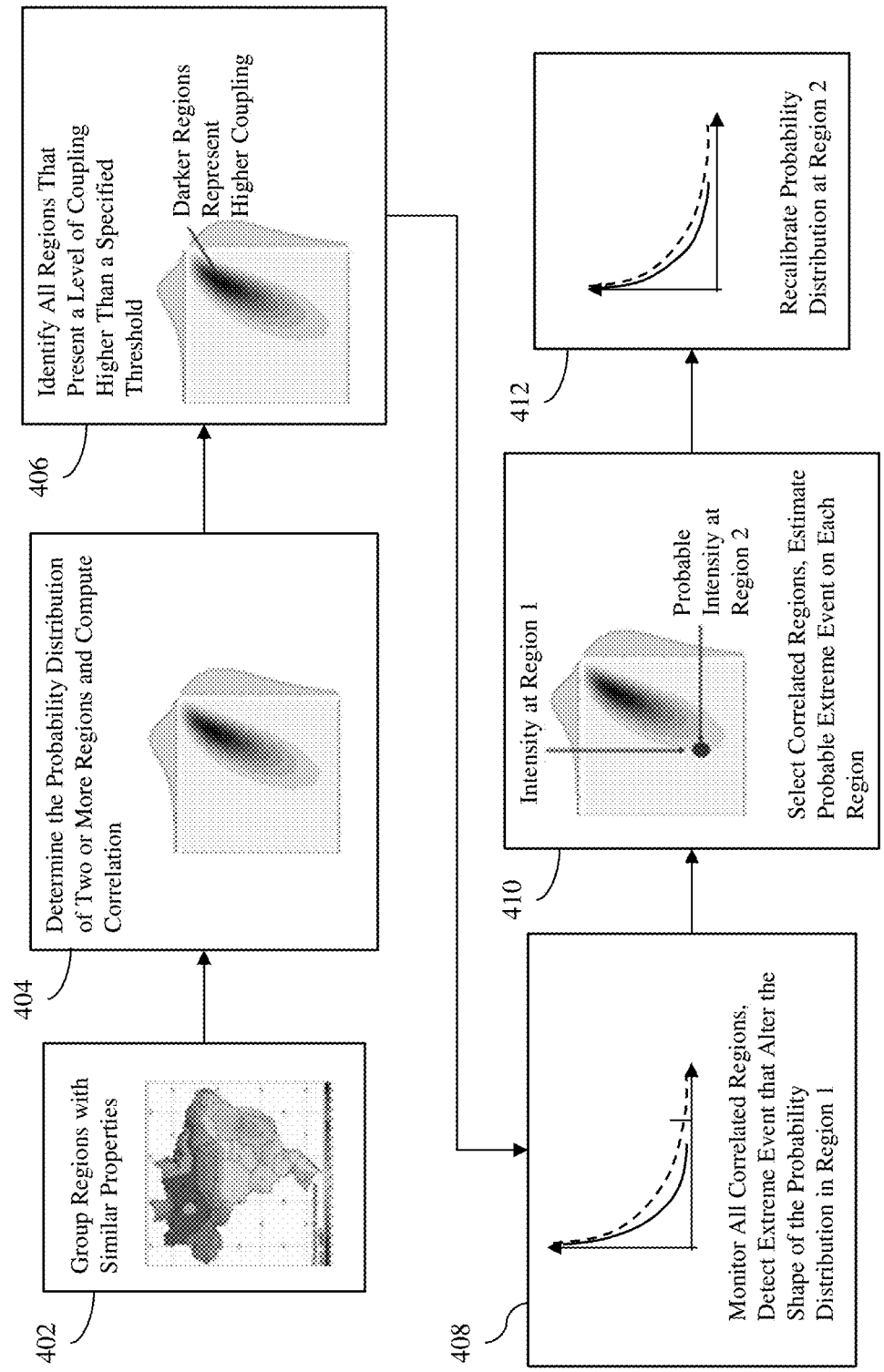
FIG. 4 is a diagram illustrating finding of regions with degree of similarity in an embodiment.

At 322, the processor may find regions that are similar, for example, regions that have a threshold degree of similarity (a degree of dependency or teleconnection). In this processing step, the processor tries to capture the level of dependency or teleconnection among separate locations. In climatic knowledge field, the concept of teleconnection indicates how much an event on a distant location can trigger an event on another one. FIG. 4 shows finding of regions with degree of similarity in an embodiment. In an embodiment, according to the climatic variables used at 318 in FIG. 3, the processor can calculate the correlation in behaviour of different (not necessarily nearby) regions with similar geospatial properties (for example a region in Brazil can have similar geospatial properties as a region in Africa). FIG. 4 at 402, for example, shows grouping regions of similar behaviour (e.g., as clustered at 318 in FIG. 3). In an embodiment, by making use of copulas method, the processor can indirectly estimate the level of correlation between two regions. Briefly, a copula is a statistical tool to calculate the dependency of random variables and is an approach, which can be used to generate stochastic coherent scenarios of this random variables. For example, shown at 404 in FIG. 4, the probability distribution of two or more regions can be determined and their correlations can be computed. A probability distribution of a region represents or shows the probability of an extreme event happening in that region. If the level of correlation surpasses or exceeds a given threshold, indicating a non-negligible level of connection between two regions, the processor can infer, responsive to an extreme event taking place on the first region, the probability of experiencing an extreme event on a second region. The threshold of correlation can be configured, e.g., provided by a user, learned by the processor automatically, e.g., by monitoring the posterior extreme events predicted by the processor, which actually happened as predicted. For instance, at 406, all regions that present a level of coupling higher than a specified threshold (also referred to as a correlation threshold) can be identified. At 406, darker regions represent higher coupling.

FIG. 4 also shows updating or recalibrating selected models of similar regions in an embodiment. For example, at 408, by monitoring all correlated regions, an extreme event can be detected (e.g., by sensor, analysis, etc.) that may alter the shape of the probability distribution in region 1 (e.g., one of the regions identified at 406 as being correlated). At 410, a correlated region (a second region or region 2) can be selected, and by using copulas, a probable extreme event on the selected region can be estimated. In an aspect, the estimated extreme event on the second region can be used to recalibrate the second region's climate variable model (e.g., assigned or created at 320 in FIG. 3), rendering it more accurate to the new reality before an extreme event takes place. For example, at 412, probability distribution at region 2 can be recalibrated. For instance, recalibrating the model recalibrates the probability distribution (output of the model). If there are more than one correlated regions identified at 406, the processing at 410 and 412 can be performed for one or more or all of the identified correlated regions. In an embodiment, a user can be prompted or given an option to select one or more models for recalibration. In another embodiment, the models can be recalibrated automatically. In an embodiment, the processing shown at 402, 404 and 406 and the processing shown at 408, 410 and 412 can be performed concurrently or in parallel. For instance, monitoring for extreme events and updating of models in similar regions (e.g., 408, 410, 412) can be performed concurrently and continually, while grouping regions with similar properties and finding correlated regions are performed, for example, also continually.

Referring back to FIG. 3, a database 324, also referred to as a similar regions map database 324 can store the similarity between regions and their descriptions. The region description can include a set of geolocated geometric shapes and the correlation level between the different regions. For example, information determined at 406 in FIG. 4 can be stored in the database 324 in FIG. 3.

Systems and methods may identify and trigger recalibration of risk related models based on extreme event detection and/or climate change conditions, and similarity of geographical region properties. Systems and methods may render such risk related models more update-to-date to be able to more accurately predict extreme events and/or climate change conditions, providing for reduction in miscalculation of risks and increase in accuracy of resilience planning. For instance, various environmentally affected resilience planning and operations can reliably use such models for estimating extreme weather event frequency.

In aspect, a system and/or method provide for the early detection of a drift on the behaviour of climatic variables due to climate change. Climate change may alter the behaviour of factors associated with weather, e.g., higher temperatures, higher daily precipitation in some places (storms), longer drought seasons, and/or others. This can mean that more extreme events (e.g., farther or more distant from the bulk of the probability distribution) may start to occur. Notably, when dealing with non-gaussian probability distributions (which is the case of many weather conditions), extreme events play a role on determining the properties of the probability distribution that governs the behaviour of a random variable.

In an aspect, risk management of weather related hazards needs a properly characterized hazard (weather-related) probability distribution and the joint probability distribution of multiple hazards. This task may include identifying the shape of the probability distribution of each hazard (for instance, pareto, lognormal, beta) and the parameters that better model a set of observations, expressing thus the frequency in which the hazard assumes a given intensity (or the frequency in which multiple hazards assume a combination of intensities). More samples provide for higher accuracy in determining the shape and parameters of the probability distribution. An extreme event can dramatically alter the calibration of parameters (and even the shape) of a probability distribution that models the behaviour of a stochastic event, and hence such an extreme event can be highly relevant for risk management. Climate change, which may cause extreme events, may alter many or all of the previously calculated probability distributions of climate variables.

Various systems, industries and player may rely on risk quantification of possible scenarios to plan their operations. These estimates have been typically based on past data for one particular region. With the shifts brought by climate change, weather patterns may be substantially different from the past, and a dynamic update on the parameters of the probability distributions of weather-related variables can become necessary. Such update, herein also called recalibration, can be governed by the occurrence of extreme events, that may become more extreme, but which may still be rare. Systems and/or methods described herein in one or more embodiments may provide a way to faster update risk models by monitoring rare extreme events, whose occurrence can be extrapolated to similar yet far away regions of the globe. The systems and/or methods in one or more embodiments may determine when and how recalibration of climate or weather aware models should happen due to climate change and extreme event detection across multiple geographies.

In one or more other embodiments, a methodology disclosed herein can apply to other scenarios in which extreme events and analogous properties of different entities can be explored. An example can include healthcare, in which risk assessment of supplies for hospitals can be monitored where analogous entities can include hospitals, e.g., with similar properties or attributes such as the number of doctors, population properties, geographical location, and/or others.

Figure 6:
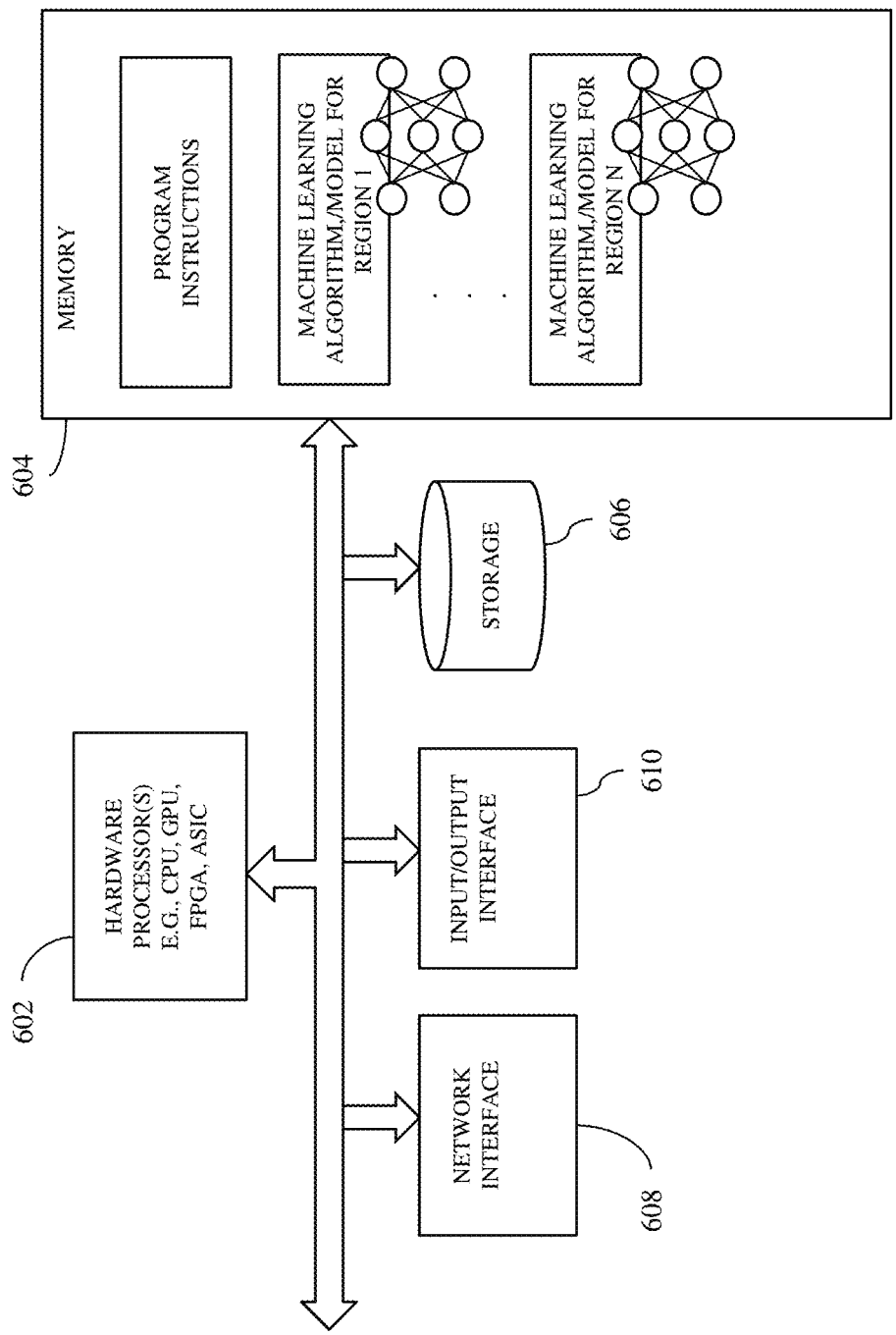
FIG. 6 is a diagram showing components of a system in one embodiment that recalibrates models in an embodiment based on detecting extreme events.

FIG. 6 is a diagram showing components of a system in one embodiment that recalibrates models in an embodiment based on detecting extreme events. One or more hardware processors 602 such as a central processing unit (CPU), a graphic process unit (GPU), and/or a Field Programmable Gate Array (FPGA), an application specific integrated circuit (ASIC), and/or another processor, may be coupled with a memory device 604, and generate and/or recalibrate (or retrain) one or more prediction models, for example, which predict probability of events or extreme events. A memory device 604 may include random access memory (RAM), read-only memory (ROM) or another memory device, and may store data and/or processor instructions for implementing various functionalities associated with the methods and/or systems described herein. One or more processors 602 may execute computer instructions stored in memory 604 or received from another computer device or medium. A memory device 604 may, for example, store instructions and/or data for functioning of one or more hardware processors 602, and may include an operating system and other program of instructions and/or data. One or more hardware processors 602 may detect an extreme event that occurred in a first region. One or more hardware processors 602 may determine that the extreme event creates a drift in an output of a machine learning model associated with the first region. One or more hardware processors 602 may retrain the machine learning model associated with the first region using data associated with the extreme event. One or more hardware processors 602 may identify a second region similar to the first region according to a defined correlation threshold. One or more hardware processors 602 may retrain a machine learning model associated with the second region based on the data associated with the extreme event. Data associated with regions and extreme events may be stored in a storage device 606 or received via a network interface 608 from a remote device, and may be temporarily loaded into a memory device 604 for recalibrating or retraining the prediction model. The learned and/or recalibrated prediction model may be stored on a memory device 604, for example, for running by one or more hardware processors 602. One or more hardware processors 602 may be coupled with interface devices such as a network interface 608 for communicating with remote systems, for example, via a network, and an input/output interface 610 for communicating with input and/or output devices such as a keyboard, mouse, display, and/or others.

Figure 7:
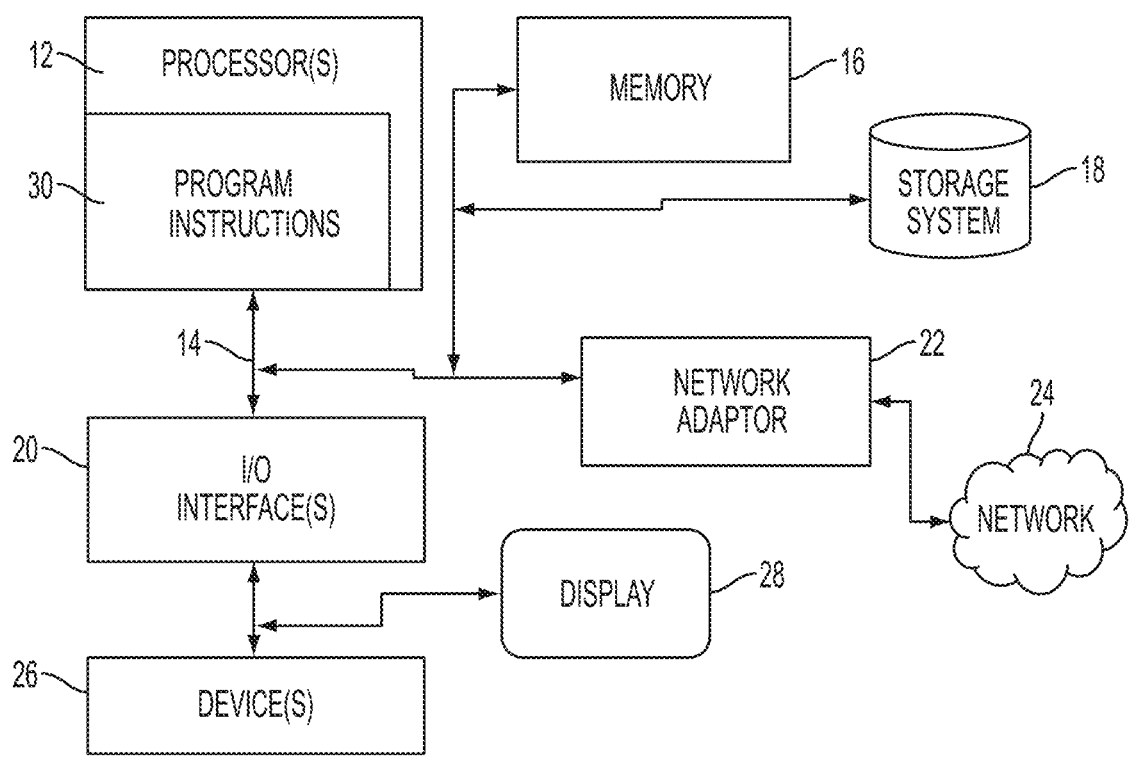
FIG. 7 illustrates a schematic of an example computer or processing system that may implement a system according to one embodiment.

FIG. 7 illustrates a schematic of an example computer or processing system that may implement a system in one embodiment. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 7 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being run by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30 that performs the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

It is understood in advance that although this disclosure may include a description on cloud computing, implementation of the teachings recited herein are not limited to a cloud computing environment. Rather, embodiments of the present invention are capable of being implemented in conjunction with any other type of computing environment now known or later developed. Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
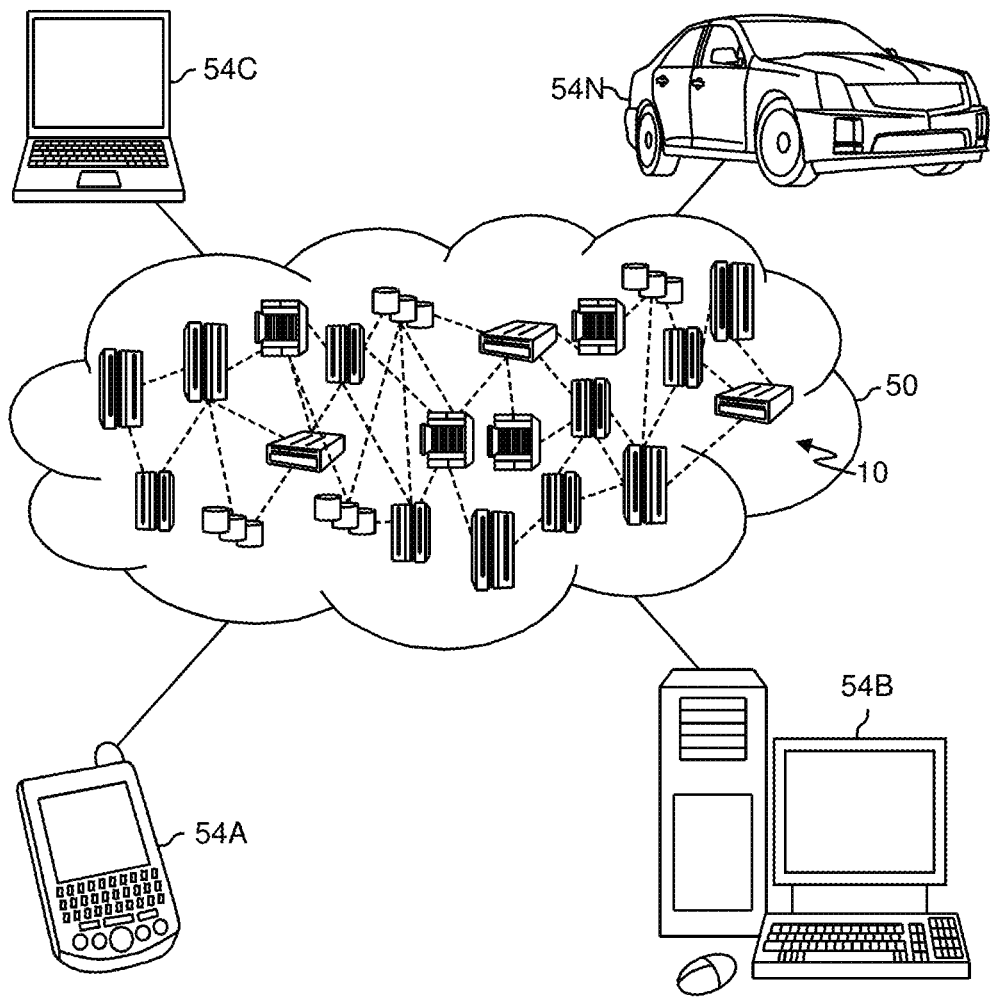
FIG. 8 illustrates a cloud computing environment in one embodiment.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
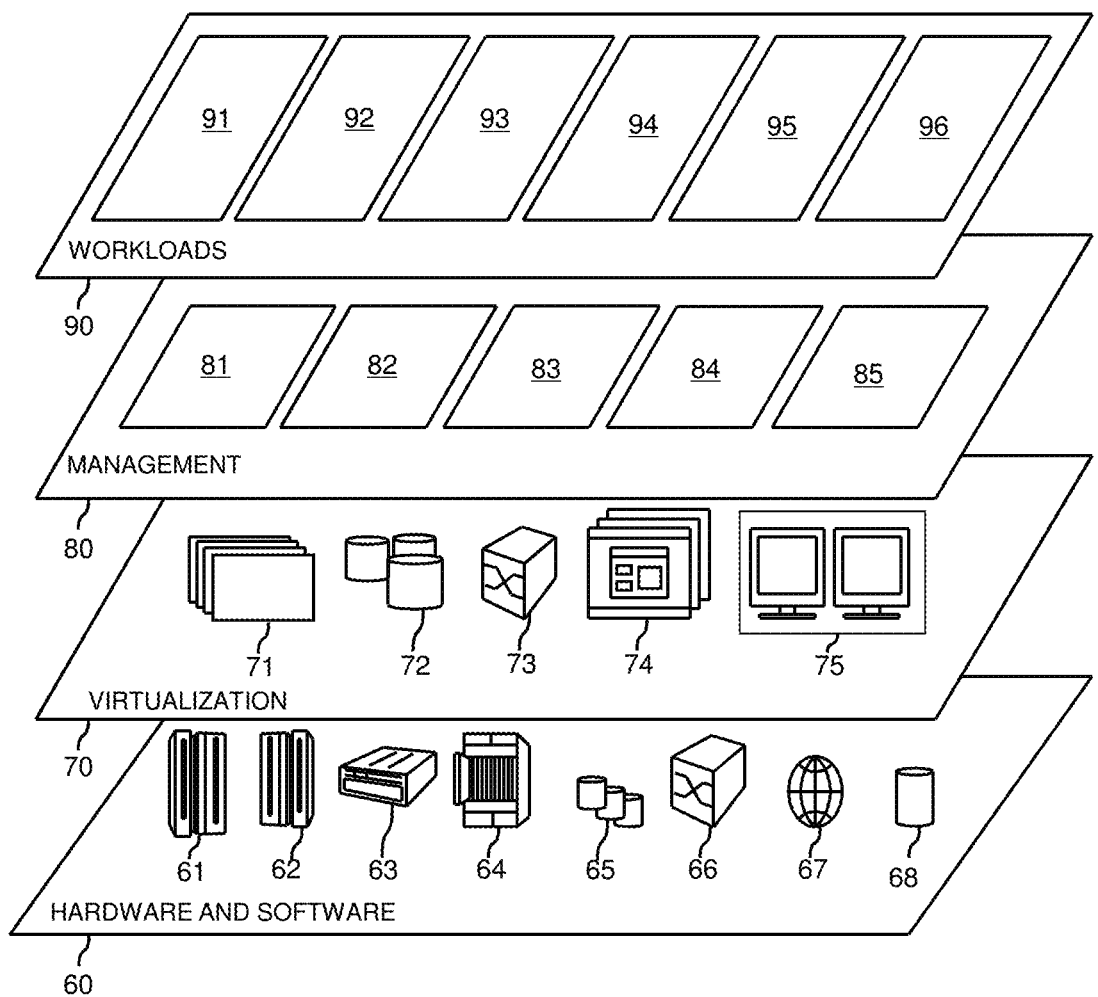
FIG. 9 illustrates a set of functional abstraction layers provided by cloud computing environment in one embodiment of the present disclosure.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below.

Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and models recalibration processing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, run concurrently, substantially concurrently, in a partially or wholly temporally overlapping manner, or the blocks may sometimes be run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. As used herein, the term "or" is an inclusive operator and can mean "and/or", unless the context explicitly or clearly indicates otherwise. It will be further understood that the terms "comprise", "comprises", "comprising", "include", "includes", "including", and/or "having," when used herein, can specify the presence of stated features, integers, steps, operations, elements, and/or components, but do not preclude the presence or addition of one or more other features, integers, steps, operations, elements, components, and/or groups thereof. As used herein, the phrase "in an embodiment" does not necessarily refer to the same embodiment, although it may. As used herein, the phrase "in one embodiment" does not necessarily refer to the same embodiment, although it may. As used herein, the phrase "in another embodiment" does not necessarily refer to a different embodiment, although it may. Further, embodiments and/or components of embodiments can be freely combined with each other unless they are mutually exclusive.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A system comprising:
a processor;
a memory device coupled with the processor;
the processor configured to at least:
detect that an extreme event occurred in a first region;
determine that the extreme event creates a drift in a probability distribution that is an output of a model associated with the first region, the model being a prediction model trained using at least historical data to forecast climatic risk related events, wherein running the model generates the probability distribution as the output, the drift determined as being created if a predicted likelihood of the extreme event according to the probability distribution output by the model of the extreme event is lower than a likelihood threshold;
retrain the model associated with the first region using data associated with the extreme event, the data including at least climatic data associated with the extreme event;
identify a second region similar to the first region according to a defined correlation threshold, wherein the second region is identified in parallel with retraining of the model associated with the first region, and wherein the second region is identified at least based on teleconnection between the first region and the second region;
generate data representing potential extreme scenarios for the second region based on the detected extreme event in the first region;
retrain a model associated with the second region based on the generated data representing potential extreme scenarios,
wherein the first region and the second region are geographical regions.

2. The system of claim 1, wherein the extreme event detected in the first region automatically triggers retraining of the model associated with the second region.

3. The system of claim 1, wherein a similarity between the second region and the first region are determined based at least on historical correlation between the second region and the first region.

4. The system of claim 3, wherein the similarity is determined further based on geospatial and non-geospatial properties of the second region and the first region.

5. The system of claim 1, wherein the model associated with the second region is retrained to predict a possible future extreme event occurring in the second region before the extreme event happens in the second region.

6. The system of claim 1, wherein the drift is detected based on comparing the output generated by the model associated with the first region and a defined extreme event likelihood threshold associated with the first region.

7. The system of claim 6, wherein the processor is further configured to adjust the defined extreme event likelihood threshold associated with the first region.

8. A computer-implemented method comprising:
detecting that an extreme event occurred in a first region;
determining that the extreme event creates a drift in a probability distribution that is an output of a model associated with the first region, the model being a prediction model trained using at least historical data to forecast climatic risk related events, wherein running the model generates the probability distribution as the output, the drift determined as being created if a predicted likelihood of the extreme event according to the probability distribution output by the model of the extreme event is lower than a likelihood threshold;

retraining the model associated with the first region using data associated with the extreme event, the data including at least climatic data associated with the extreme event;

identifying a second region similar to the first region according to a defined correlation threshold, wherein the second region is identified in parallel with retraining of the model associated with the first region, and wherein the second region is identified at least based on teleconnection between the first region and the second region;

generating data representing potential extreme scenarios for the second region based on the detected extreme event in the first region;

retraining a model associated with the second region based on the generated data representing potential extreme scenarios; and based on outputs of the retrained model associated with the first region and the retrained model associated with the second region, learning and updating the likelihood threshold used for considering likely events, wherein the first region and the second region are geographical regions.

9. The method of claim 8, wherein the extreme event detected in the first region automatically triggers retraining of the model associated with the second region.

10. The method of claim 8, wherein a similarity between the second region and the first region are determined based at least on historical correlation between the second region and the first region.

11. The method of claim 10, wherein the similarity is determined further based on geospatial and non-geospatial properties of the second region and the first region.

12. The method of claim 8, wherein the model associated with the second region is retrained to predict a possible future extreme event occurring in the second region before the extreme event happens in the second region.

13. The method of claim 8, wherein the drift is detected based on comparing the output generated by the g model associated with the first region and a defined extreme event likelihood threshold associated with the first region.

14. The method of claim 13, further including adjusting the defined extreme event likelihood threshold associated with the first region.

15. A computer program product comprising a computer readable storage medium having program instructions embodied therewith, the program instructions readable by a device to cause the device to:

detect that an extreme event occurred in a first region;

determine that the extreme event creates a drift in a probability distribution that is an output of a model associated with the first region, the model being a prediction model trained using at least historical data to forecast climatic risk related events, wherein running the model generates the probability distribution as the output, the drift determined as being created if a predicted likelihood of the extreme event according to the probability distribution output by the model of the extreme event is lower than a likelihood threshold;

retrain the model associated with the first region using data associated with the extreme event, the data including at least climatic data associated with the extreme event;

identify a second region similar to the first region according to a defined correlation threshold, wherein the second region is identified asynchronously and in parallel with retraining of the model associated with the first region, and wherein the second region is identified at least based on teleconnection between the first region and the second region;

generate data representing potential extreme scenarios for the second region based on the detected extreme event in the first region;

retrain a model associated with the second region based on the generated data representing potential extreme scenarios; and based on outputs of the retrained model associated with the first region and the retrain model associated with the second region, learn and update the likelihood threshold used for considering likely events, wherein the first region and the second region are geographical regions.

16. The computer program product of claim 15, wherein the extreme event detected in the first region automatically triggers retraining of the model associated with the second region.

17. The computer program product of claim 15, wherein a similarity between the second region and the first region are determined based at least on historical correlation between the second region and the first region.

18. The computer program product of claim 17, wherein the similarity is determined further based on geospatial and non-geospatial properties of the second region and the first region.

19. The computer program product of claim 15, wherein the model associated with the second region is retrained to predict a possible future extreme event occurring in the second region before the extreme event happens in the second region.

20. The computer program product of claim 15, wherein the drift is detected based on comparing the output generated by the model associated with the first region and a defined extreme event likelihood threshold associated with the first region.

* * * * *